(12) United States Patent
Arslan et al.

(10) Patent No.: US 9,672,825 B2
(45) Date of Patent: Jun. 6, 2017

(54) SPEECH ANALYTICS SYSTEM AND METHODOLOGY WITH ACCURATE STATISTICS

(71) Applicant: SESTEK SES VE ILETIŞIM BILGISAYAR TEKNOLOJILERI SANAYI VE TICARET ANONIM ŞIRKETI, Istanbul (TR)

(72) Inventors: Mustafa Levent Arslan, Istanbul (TR); Ali Haznedaroğlu, Istanbul (TR)

(73) Assignee: SESTEK SES ILETISIM BILGISAYAR TEKNOLOJILERI SANAYI VE TICARET ANONIM SIRKETI, Istanbul (TR)

(*) Notice: Subject to any disclaimer, the term of this patent is extended or adjusted under 35 U.S.C. 154(b) by 60 days.

(21) Appl. No.: 14/759,201

(22) PCT Filed: Jan. 3, 2013

(86) PCT No.: PCT/TR2013/000002
§ 371 (c)(1),
(2) Date: Jul. 3, 2015

(87) PCT Pub. No.: WO2014/107141
PCT Pub. Date: Jul. 10, 2014

(65) Prior Publication Data
US 2015/0350438 A1     Dec. 3, 2015

(51) Int. Cl.
*H04M 1/64* (2006.01)
*G10L 15/26* (2006.01)
*G06N 99/00* (2010.01)
*G06Q 10/06* (2012.01)
*H04M 3/22* (2006.01)
*G10L 25/63* (2013.01)
(Continued)

(52) U.S. Cl.
CPC ............ *G10L 15/26* (2013.01); *G06N 99/005* (2013.01); *G06Q 10/06398* (2013.01); *G10L 15/07* (2013.01); *G10L 15/20* (2013.01); *G10L 17/26* (2013.01); *G10L 25/63* (2013.01); *G10L 25/84* (2013.01); *G10L 25/93* (2013.01); *H04L 12/1831* (2013.01); *H04M 3/2281* (2013.01); *H04M 3/42221* (2013.01); *H04M 3/5175* (2013.01); *H04M 2203/401* (2013.01)

(58) Field of Classification Search
CPC ...... H04M 3/42221; H04M 2201/40–2201/41; G10L 15/00; G10L 17/00
USPC ............................................. 379/88.01–88.02
See application file for complete search history.

(56) References Cited

U.S. PATENT DOCUMENTS

2002/0194002 A1   12/2002   Petrushin
2004/0249650 A1   12/2004   Freedman et al.
(Continued)

FOREIGN PATENT DOCUMENTS

WO      WO 2008/042725 A2     4/2008

*Primary Examiner* — Van D Huynh
(74) *Attorney, Agent, or Firm* — Gokalp Bayramoglu

(57) ABSTRACT

The present invention relates to implementing new ways of automatically and robustly evaluating agent performance, customer satisfaction, campaign and competitor analysis in a call-center and it is comprising; analysis consumer server, call pre-processing module, speech-to-text module, emotion recognition module, gender identification module and fraud detection module.

16 Claims, 4 Drawing Sheets

(51) Int. Cl.
*G10L 15/20* (2006.01)
*H04L 12/18* (2006.01)
*H04M 3/42* (2006.01)
*H04M 3/51* (2006.01)
*G10L 25/93* (2013.01)
*G10L 17/26* (2013.01)
*G10L 25/84* (2013.01)
*G10L 15/07* (2013.01)

(56) References Cited

U.S. PATENT DOCUMENTS

| | | | |
|---|---|---|---|
| 2006/0074690 A1* | 4/2006 | Xu | G10L 21/06 |
| | | | 704/276 |
| 2006/0233347 A1 | 10/2006 | Tong et al. | |
| 2007/0071206 A1* | 3/2007 | Gainsboro | H04M 3/2281 |
| | | | 379/168 |
| 2007/0185704 A1* | 8/2007 | Yoshimura | G10L 17/26 |
| | | | 704/10 |
| 2011/0010173 A1 | 1/2011 | Scott et al. | |
| 2011/0282661 A1 | 11/2011 | Dobry et al. | |

* cited by examiner

| AGENT STATISTICS | Criteria | Minimum | Maximum | Average | C.C. Average | Reference | Unit |
|---|---|---|---|---|---|---|---|
| ● Agent ○ Agent Group | Agent Anger Duration | 0 ▶ | 0 ▶ | 0,00 | 0,85 | 0 - 5 | seconds |
| Operator ▼ | Customer Anger Duration | 0 ▶ | 10 ▶ | 0,27 | 2,58 | 0 - 5 | seconds |
| Show Statistics | Agent Anger Ratio | 0 ▶ | 0 ▶ | 0,00 | 0,75 | 0 - 2 | percent |
| | Customer Anger Ratio | 0 ▶ | 13 ▶ | 0,33 | 2,10 | 0 - 2 | percent |
| | Overlap Duration | 0,00 ▶ | 124,93 ▶ | 6,73 | 15,18 | 0 - 30 | seconds |
| | Overlap Ratio | 0 ▶ | 36 ▶ | 10,86 | 9,27 | 0 - 20 | percent |
| | Agent Interrupt Count | 0,00 ▶ | 9,04 ▶ | 2,62 | 2,72 | 0 - 3 | count/minute |
| | Customer Interrupt Count | 1,47 ▶ | 20,95 ▶ | 9,06 | 5,29 | 0 - 3 | count/minute |
| | Speed | 6,56 ▶ | 27,27 ▶ | 15,77 | 17,32 | 16 - 20 | letters/sec |
| | Monotonicity | 5 ▶ | 97 ▶ | 59,35 | 56,33 | 30 - 70 | percent |
| | Total Silence | 0,39 ▶ | 489,18 ▶ | 22,79 | 58,45 | 0 - 60 | seconds |
| | Maximum Silence | 0,22 ▶ | 85,33 ▶ | 5,11 | 8,85 | 0 - 20 | seconds |
| | Silence Ratio | 6,00 ▶ | 63,00 ▶ | 21,53 | 25,63 | 0 - 50 | percent |
| | Silence Count | 0,00 ▶ | 0,51 ▶ | 0,06 | 0,02 | 0 - 1 | count/minute |
| | Customer Share | 31 ▶ | 80 ▶ | 62,44 | 58,65 | 40 - 80 | percent |
| | Agent Block Duration | 0,00 ▶ | 0,00 ▶ | 0,00 | 3,43 | 0 - 20 | seconds |
| | Customer Block Duration | 0,00 ▶ | 50,80 ▶ | 0,79 | 6,47 | 0 - 60 | seconds |
| | Agent Block Count | 0,00 ▶ | 0,00 ▶ | 0,00 | 0,18 | 0 - 1 | count/minute |
| | Customer Block Count | 0,00 ▶ | 0,79 ▶ | 0,13 | 0,15 | 0 - 1 | count/minute |
| | Agent Hesitation Count | 3,82 ▶ | 12,12 ▶ | 8,80 | 11,33 | 0 - 12 | count/minute |
| | Agent Speech Duration | 1 ▶ | 213 ▶ | 18,17 | 63,24 | 0 - 300 | seconds |
| | Customer Speech Duration | 2 ▶ | 380 ▶ | 29,05 | 79,68 | 0 - 300 | seconds |
| | Total Duration | 6 ▶ | 1052 ▶ | 65,83 | 192,25 | 0 - 300 | seconds |
| | Anger Max Prob. Agent | 0,00 ▶ | 0,00 ▶ | 0,00 | 5,09 | 0 - 30 | percent |
| | Anger Max Prob. Customer | 0,00 ▶ | 86,00 ▶ | 3,45 | 10,21 | 0 - 30 | percent |
| | Number of agent calls covered: 64 | | | | | | |

Figure 6

SPEECH ANALYTICS SYSTEM AND METHODOLOGY WITH ACCURATE STATISTICS

FIELD OF THE INVENTION

The present invention relates to implementing new ways of automatically and robustly evaluating agent performance, customer satisfaction, campaign and competitor analysis in a call-center.

The present invention especially relates to automatically analyzing the conversations between agents and customers to extract useful information from call-center recordings.

BACKGROUND

Today, speech-to-text systems are commonly used for speech-mining in call center applications as they can give rich speech to text outputs that can be used for many different information retrieval purposes.

However, speech recognition performance of such systems degrade due to some harsh conditions such as background speech and noises, huge speaking style variability of the speakers and high perplexity of largely varying request content. This degradation in speech-to-text performance may affect the following analysis, and decrease the reliability of the statistics inferred from the speech-analytics system:
  Agent voice's monotonicity
  Agent speaking rate
  Agent/customer interrupt, block speaking counts
  Dialog-based analysis Speech-to-text systems also demand powerful analysis servers as the speech recognition module is also highly CPU-intensive. This situation creates extra need for hardware and increases the overall costs excessively.

In the prior art, speech analytics systems are gradually being improved and alternatives are being created for making accurate statistics into such kind of systems. However, accuracy rates of these input alternatives are not much higher.

In conclusion; improvements are being made in the methods providing speech analytics and transmission of a speech as a text into hardware with minimum error, therefore new embodiments eliminating the disadvantages touched above and bringing solutions to existing systems are needed.

SUMMARY OF THE INVENTION

The present invention relates to a method meeting the above mentioned requirements, eliminating all the disadvantages and introducing some additional advantages, providing automatically and robustly evaluating agent performance, customer satisfaction, campaign and competitor analysis in a call-center.

A purpose of the invention is to construct a grid-based analysis structure that utilizes the agent PC's. This grid base structure eliminates the need for extra hardware and therefore reduces cost for the overall system implementation.

A still another purpose of the invention is to improve the speech recognition performance of the speech analytics system by training separate language models for agent and customer channels. In call-center conversations, agents and customers' speech contexts differ as agent speech is mostly script based, while customer speech is more free-context. So, agent and customer specific language models are trained separately, which decreases the language model perplexity for both channels and thus improving the speech recognition accuracies.

A still another purpose of the invention is to include a speech-filler model while training the acoustic models. This speech-filler model accounts for out of vocabulary words together with background speech and increases the speech recognition performance and the reliability of the speech-to-text module.

A still another purpose of the invention is to develop a method that filters the background speech using energy variations in the call. In call centers, there is a high level of background speech interfering with the agent's speech and noise suppression systems cannot deal with this type of non-stationary noise effectively. By using the energy information of the opposite channel, validity of current channel's speech regions are decided, and background speech parts are filtered.

A still another purpose of the invention is to develop a robust method of calculating agents' speech. Agent's speech speed calculation is heavily affected by the speech recognition performance, and in cases having low recognition accuracies, this calculation may give wrong results. To overcome this problem, commonly used agent scripts which have higher recognition accuracies are used in speech speed calculations.

A further purpose of the invention is to develop a robust method of calculating interrupt counts. Interruptions during the conversation are good indications of participant behavior, and a stop-word filtering method is invented to get the correct counts.

A further purpose of the invention is to develop a robust method of calculating agent voice's monotonicity, which uses energy levels of the speech to filter out background speech.

A still purpose of the invention is to develop new methods of analyzing agent performance. One of these methods is to calculate a metric called agent hesitation count per minute. Agent hesitation count shows the confidence and control of the agent on the conversation subject, and it is a good measure of effective communication. Using the speech-to-text output of the agent channel, number of times that the agent hesitates is found, and then it is normalized by the agent speech duration on the entire call to get this metric's result.

A further purpose of the invention is to develop new methods of analyzing conversion effectiveness. One of these methods is to calculate a new metric called "customer share", which shows the participation of the customer to the conversation. Customer share is calculating by comparing the agent and customer speech durations on the call. Another method to analyze conversion effectiveness is to calculate the maximum silence duration of the call using the speech-to-text output of both channels to find the parts where no participant speaks. Another method to measure conversion effectiveness is to find the anger locations on both channels using the emotion recognition module.

A further purpose of the invention is to integrate a fraud-detection module to the speech analytics system, which shows the calls that are likely to be fraud using a voice verification engine. Also a gender detection module in integrated to automatically find the customer's gender.

A still purpose of the invention is to integrate new modules which allow the system user to examine the final results more efficiently. One of these modules is the statistical comparison module, which is used for analyzing events by comparing the text and other analyses outputs statistics.

Another module is used for analyzing agent performance by showing the agent's performance as a blood-test table. This table shows the minimum, maximum, and average of each analysis parameter of an agent's calls from a certain time slice.

The structural and characteristic features of the invention and all the advantages will be understood better in detailed descriptions with the figures given below and with reference to the figures, and therefore, the assessment should be made taking into account the said figures and detailed explanations.

BRIEF DESCRIPTION OF THE DRAWINGS

To understand of the embodiment of present invention and its advantages with its additional components in the best way, it should be evaluated together with below described figures.

DETAIL DESCRIPTION OF THE INVENTION

Figure 1:
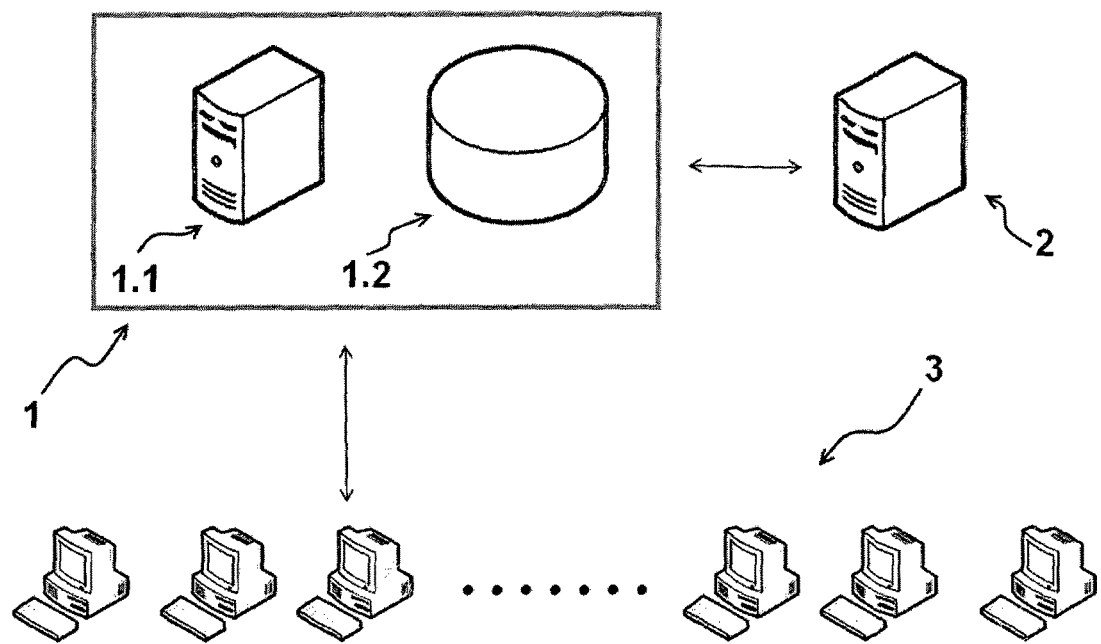
FIG. 1. Speech analytics system which includes the grid-based analysis structure and the interaction of the elements required for implementation of the methods are illustrated schematically FIG. 2. Sub-modules of call analysis consumer servers (3) are illustrated as flowchart schematically.
Figure 2:
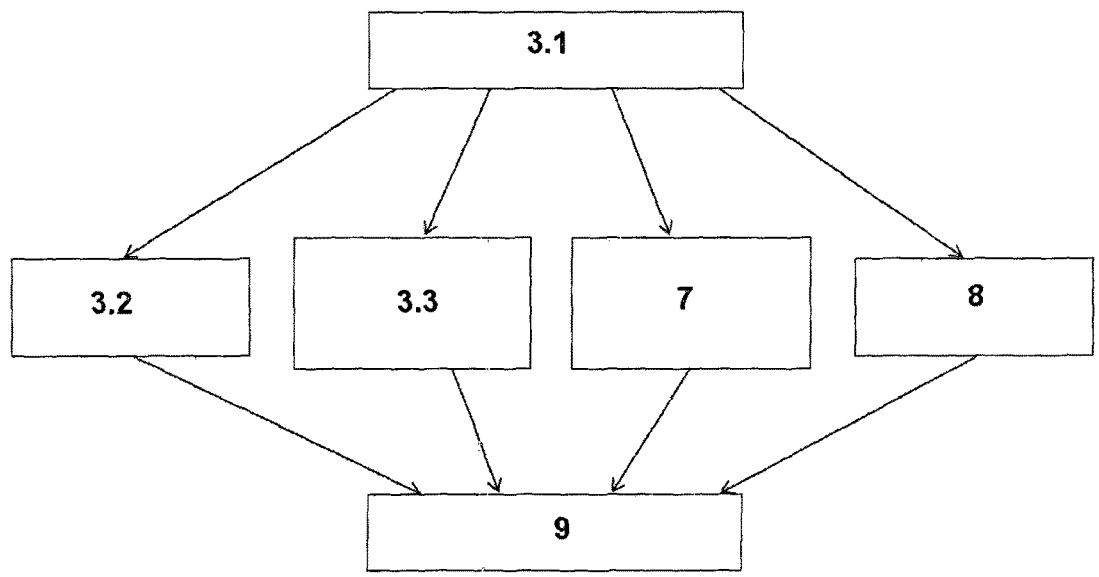
Figure 3:
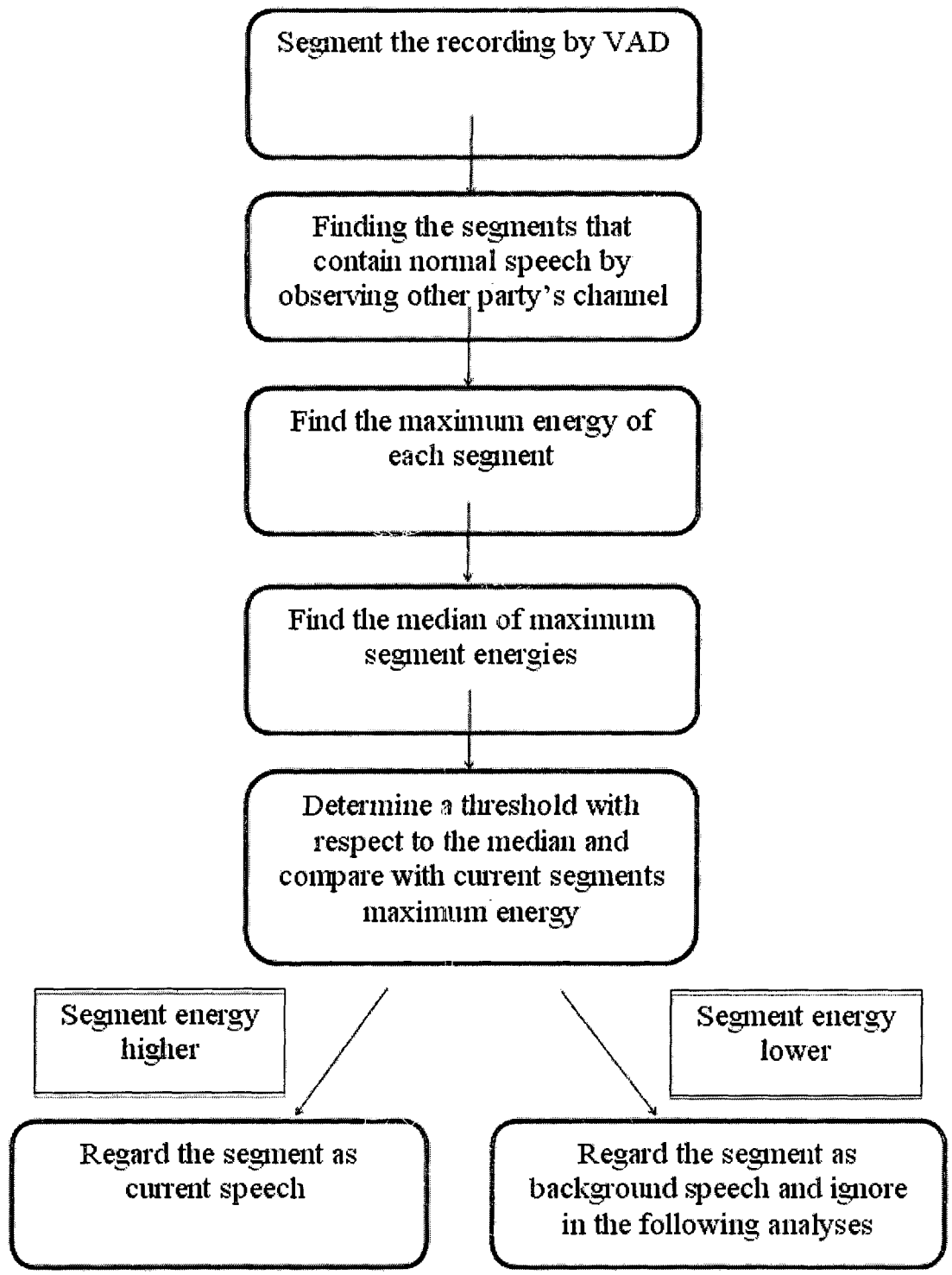
FIG. 3. Steps of the new method in filtering background speech by energy variation is shown as flowchart.
Figure 4:
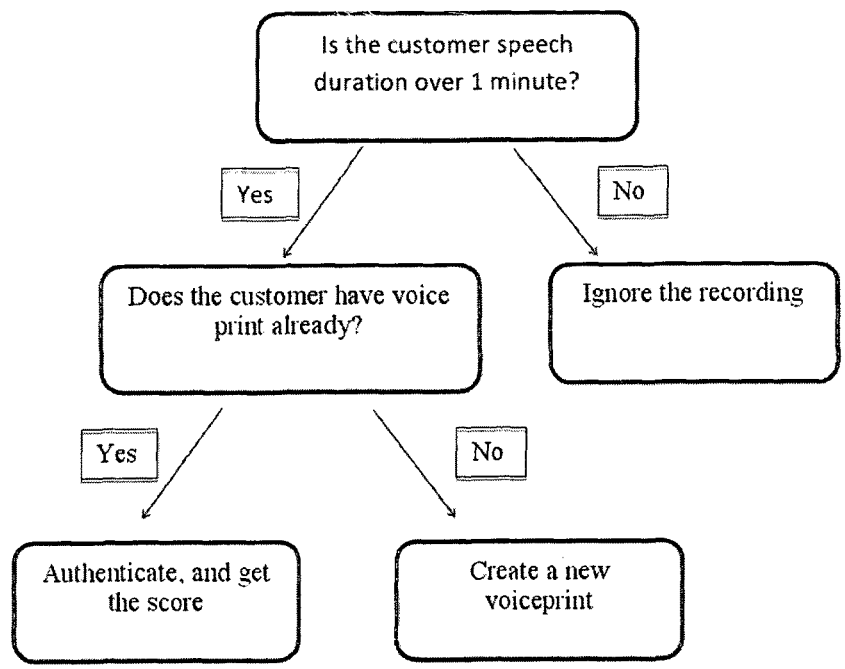
FIG. 4. Steps of the fraud-detection method realizing by the fraud detection module (8) is illustrated schematically FIG. 5. It is a schematic view indicating the method steps of the statistical comparison component which includes speech-to-text module and emotion recognition module FIG. 6. It is a view of the agent/agent group statistics screen. A new GUI component to show the agent performance The drawings do not need to be absolutely put to scales and details not essential to understand the present invention may have been omitted. Furthermore, the elements that are at least identical, or at least substantially have identical functions are illustrated with the same number.
Figure 5:
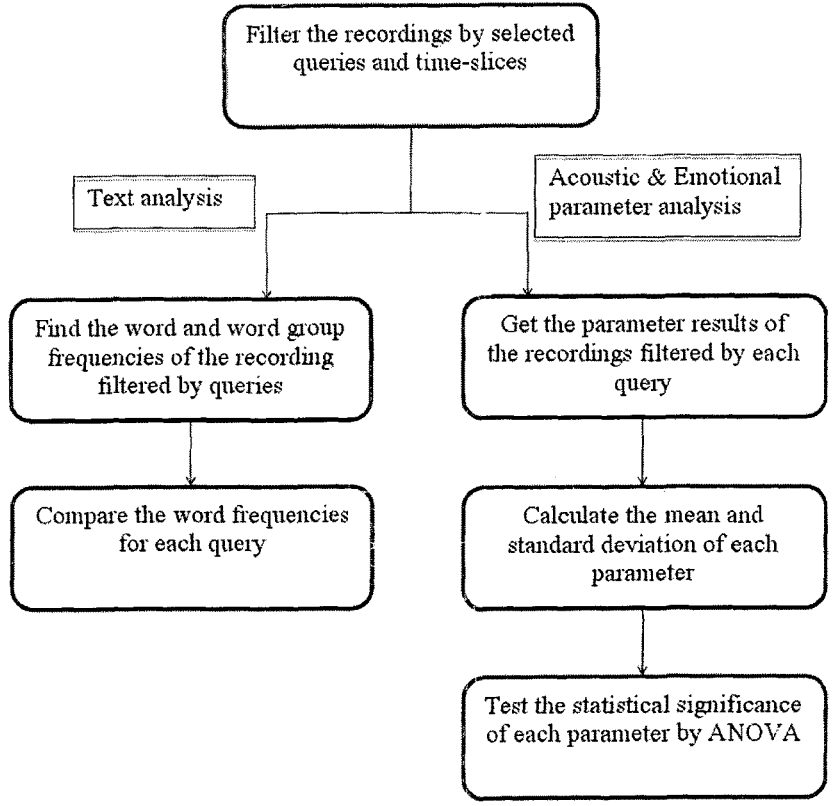

1. Voice Recording System
    1.1 Recording Server
    1.2 Database
2. Analysis Provider Server
3. Analysis Consumer Server
    3.1. Call pre-processing Module
    3.2. Speech-to-text Module
    3.3. Emotion Recognition Module
7. Gender Identification Module
8. Fraud Detection Module
9. Post-processing Module
S: Speech Analytics System/System In this detailed description, the preferred embodiments of the method providing the subject of the invention are disclosed only for better understanding of the subject, and in a manner not constituting any restrictive effect.

Functions realized sequentially by the speech analytics system (S) being the subject of the invention;
    Training the acoustic and language models that are used in the speech-to-text module (3.2)
    Training the emotion classification models that are used in the emotion recognition module (3.3)
    Training the gender identification models that are used in the gender identification module (7)
    Training the voice verification models that will be later used in the fraud detection module (8)
    Recording the agent-customer conversations in a call-center using the voice recording system (1)
    Adding the newly recorded calls from (1) to the analysis queue using the call analysis provider server (2)
    Picking the available call in the analysis queue and starting its analysis in the call analysis consumer (3)
    Separating the call into its customer and agent channels using the call-preprocessing module (3.1) of the analysis consumer (3)
    Automatically segmenting the agent/customer mono channels into voice/unvoiced and background speech parts using the call pre-processing module (3.1) of the analysis consumer (3)
    Automatically transcribing and time-aligning the agent/customer conversations using the speech-to-text module (3.2)
    Automatically classifying and labeling the agent/customer speeches as angry/normal using the emotion recognition module (3.3)
    Automatically identifying the customer's gender using the gender identification module (7)
    Detecting the fraud probability of the customer using the fraud-detection module (8)
    Post-processing the outputs of the previous modules (3.2, 3.3, 7, 8) using the post processing module (9)

It is mentioned that speech analytics system (S) relates to automatically analyzes the conversations between agents and customers to extract useful information from call-center recordings. The extracted information can be used in evaluating agent performance, customer satisfaction, campaign and competitor analysis etc. in a call-center. Manual extraction of these information by people is a very costly process both time and resource wise, and only a very small ratio of all calls can be analyzed. By using the speech analytics system, all of the calls are automatically analyzed in a more affordable manner. In this work, new ways to improve the current speech analytics mechanism are implemented in order to get more reliable analysis results.

Speech analytics process starts with recording the calls using the voice recording system (1). This is a voice over IP based system that records the agent-customer calls in G711, stereo format, and it contains a database, together with a physical storage. Briefly, records the agent customer calls over station IP's and writes them in its database and physical storage.

The calls, which are suitable for speech analysis, are then added to the analysis queue by the analysis provider server (2). This server, gets the newly collected calls from the recording system (1) database, and queues the suitable calls to be analyzed in a separate table.

Then, analysis consumer servers (3) analyze the calls in the queue using its sub-components (modules), namely call pre-processing module (3.1) speech-to-text module (3.2) and emotion recognition module (3.3). In the system (S), a gender identification module (7), and a fraud detection module (8) to detect fraud customer calls are also included. Then a post-processing module (9) merges the outputs of the previous modules to calculate the final analysis results.

Call pre-processing module (3.1), the sub-module of the analysis consumer server (3), first separates the stereo calls recorded by voice recording system (1) into mono agent and agent/customer channels. These channels are to be analyzed separately in the following modules, and their outputs are then merged together to get the final analysis results. After the channel separation, each channel is automatically segmented into voiced and unvoiced parts using energy based VAD module which uses the energy variations in the call to decide the segments that contain speech. Only voiced segments are then used in the following modules. This module also detects the background speech, which is one of our claims in the application (Claim 4 in Claims section)

Speech-to-text module (3.2), the another sub-module of the analysis consumer server (3), automatically transcribes the agent and customer speech segments into texts using pre-trained pattern recognition components, namely acoustic and language models which are trained using corpora of manually transcribed speech. Speech-to-text module (3.2) outputs a time-aligned transcription of both channels, and these transcriptions are used in the post-processing module (9) to obtain analysis results like agent speech speed, agent/customer interrupt and block speaking counts, maximum silence duration in the call, customer share ratio, and agent hesitation count.

Emotion recognition module (3.3), classifies the agent and customer speech segments into angry, and non-anger emotion states using predefined emotion recognition models which are trained using manually labeled data of normal and angry voice segments. Outputs of this module are used in analysis results like, agent/customer anger durations, ratios, and levels. This module also outputs agent's voice monotonicity, which shows the tone variation level of the agent voice.

There are also two new modules that work on analysis consumer server (3). The first one is the gender identification module (7), which identifies the gender of the customer using pre-trained pattern recognition models. The second one is a voice-verification based customer fraud detection module (8), which decides the fraud probability of the calls using the customer speech segments. The claims for these modules will be explained in the following sections.

The outputs of the previous modules are then conducted to the post-processing module (9) which collects the outputs of the previous modules (5, 6, 7, and 8) and merges them to show the final analysis results of the call. These analysis results are then used in evaluating agent performance, customer satisfaction, conversation effectiveness etc.

Speech analytics system's (S) analysis results are as follows (Claims are listed at the end of this document):
Speech-to-text outputs of agent/customer sides
Anger duration/ratio of agent/customer sides
Agent/customer anger locations (includes new method—Claim 11)
Overlap duration during the conversation
Agent/customer interrupt counts per minute (includes new method—Claim 6)
Agent customer block speaking durations
Agent's speech speed (includes new method—Claim 5)
Agent's voice monotonicity level (includes new method—Claim 7)
Agent's hesitation count per minute (includes new method—Claim 8)
Customer share (participation) (includes new method—Claim 9)
Total silence duration/ratio
Maximum silence duration (includes new method—Claim 10)
Customer gender—(includes new method—Claim 13)
Fraud probability of the call (includes new method—Claim 12)
These results then can be compared and analyzed using:
Statistical comparison component (includes new component—Claim 14)
Agent performance GUI (includes new component—Claim 15)

Training Method of the "Agent/Customer Language Models" which are Used in the Speech-to-Text Module (5):

An essential component of all speech-to-text systems is the "language model" which calculates the probability of generating word sequences in a language. Language modeling is data-driven technique, in order to estimate the probability distributions of the word sequences; data is trained, which is text. Traditional speech-to-text systems, train language models from a single text, and use this model in their ongoing analysis.

In this case, there is a stereo voice recording system (1) in the speech analytics system (S) which allows us to separate agent and customer speech from each other and therefore analyze them individually in the speech-to-text module (3.2). We train and afterwards use different Language Models (LM) for speech-to-text transcription since agent speech is mostly script based and they have a limited vocabulary. This allows us to obtain a higher level of accuracy for speech to text transcription. For customer speech there is a wider range of topics and vocabulary. Therefore different LMs are trained and used for agents and customers in the speech-to-text module (3.2) and this new method increases the speech-to-text correctness of the system (S), thus the analysis reliability.

Training Method of the "Acoustic Model" which are Used in the Speech-to-Text Module (3.2):

An "acoustic model" resembles the vocal characteristic of the speech units, and their relations with each other. Acoustic models are also data driven, and trained from manually-transcribed speech segments.

In acoustic model training and usage, there is a speech-filler model that accounts for out of vocabulary (OOV) words and background speech in order to increase the speech recognition performance and the reliability of the speech-to-text module (3.2). Some previous systems also train additional background models like [JP5204394], but in their case acoustic models are word-based, opposed to our models which are phoneme based. Phoneme-based models that are used for normal and background speech represent the voice characteristics better and in more detail; hence they result in higher speech-to-text accuracies.

A Grid-Based Structure to Utilize Agent PC's as the Analysis Consumer Servers (3):

Traditionally there are multiple powerful and costly analysis consumer servers (3) in a speech analytics system (S) dedicated for speech-to-text module (3.2) and emotion recognition module (3.3). In the system (S) a grid-based structure is applied to utilize agent PC's in case of analysis consumer servers (3). This eliminates the need for extra hardware and therefore reduces cost for the overall system implementation as agent PCs that are utilized already exists in the call-center, and no additional server investments are needed.

The Method for Filtering the Background Speech Using Energy Variations in the Pre-Processing Module (4):

In call centers, there is a high level of background speech interfering with the agent's speech. Noise suppression systems cannot deal with this type of non-stationary noise effectively. Since the speech recognition system cannot differentiate between agent's speech and other speech in the background. This background speech is also transcribed. These wrong transcriptions decrease the accuracy of statistical analyses in a speech analytics system.

In this system (S), we use the information from opposite channel in deciding about the validity of current channel's speech regions. Normally it is not very likely that throughout the whole conversation both parties will be talking at the same time Therefore system (S) analyzes the regions where the opposite party in not speaking using the previous voiced/unvoiced decisions. From those regions, an estimate volume level is calculated for the current participant's speech. Then based on this volume level, a certain ratio of that volume level is set as a threshold for the voice activity detection system. Most of the background speech is eliminated from the system by using this threshold and regarding segment below this threshold as background speech. Some previous methods also use energy based SNR threshold techniques to estimate the speech level such as [US2008228478], but they use the whole sound recording. In this case, we use the opposite channel's information in deciding about the validity of speech regions, leading to a better estimation of the normal speech volume level.

Robust Method of Calculating Agent's Speech Speed in the Post-Processing Module (9) for Agent Performance Analysis:

Speed calculations are done by the post-processing module (9) using the text and time-aligned outputs of the speech-to-text module (3.2). To find the agent's speech speed, system (S) calculates the total duration of agent's speech from the time-aligned outputs, and divides this duration to the total number of letters in the output text.

This method's correctness is strongly-related the speech-to-text module's (3.2) performance: As the speech-to-text module (3.2) makes more recognition errors the reliability of this metric degrades significantly. Agents usually follow routine scripts in their speech. If the length of those scripts are long (e.g. "Welcome to . . . , how can I help you") then false alarm rate of the speech-to-text outputs decreases significantly. So, if frequently used 3-4 word phrases are used as major indicators for agent speed computation, then a much higher accuracy in agent speed computation can be achieved. Therefore, in the agent speed computation; a text area, where commonly used agent scripts and phrases with high recognition accuracies can be entered, is employed. Then, the speech-to-text output of the agent channel is searched for these phrases, and only uses these phrases' letter counts and durations in speech speed calculations.

A Robust Method of Calculating Interrupt Counts in the Post-Processing Module (9) for Agent Performance and Customer Satisfaction Analysis:

Interruptions during the agent/customer conversations are good indicators of agent performance and customer satisfaction. Agents shouldn't interrupt the customers, and if a customer interrupts the agent many times during the conversation, it shows that the customer is angry or unsatisfied.

Interrupt counts are found from the speech-to-text module's (3.2) output text and its time-alignments. But there are some approval words like "yes", "ok" that shouldn't have count as interruptions. Other systems may get erroneous results by taking these kinds of words into account.

In this method, the users are allowed to enter this kind of "stop words" to the system, and ignore these words if they occur in the speech-to-text outputs when calculating the interrupt counts. The filler words are also ignored in the system and the interrupt counts are normalized by other party's speech duration to have more useful and robust results. This new normalized analysis metric is called "interrupt count per minute".

A Robust Method of Calculating Agent's Voice Monotonicity Level Calculation in the Post-Processing Module (9):

A robust method is implemented for agent voice's monotonicity level evaluation. Agent's voice monotonicity level is used in agent performance analysis as agents shouldn't speak in a monotone manner with the customers.

In some cases, background speech may be from a different gender, resulting in pitch with high variance and lower monotonicity level. In order to solve this problem we concentrate on energy level as well and disregard low energy regions in statistical pitch calculations.

The Method for Analyzing Agent Performance by a Proposed Metric Called "Hesitation Count Per Minute":

Using the outputs of the speech-to-text module (3.2), we find the speech parts that the agent hesitates and normalize the hesitation count by agent speech duration on the entire call. This new parameter "agent hesitation count per minute", which is calculated in the post-processing module (9), shows the confidence and control of the agent on the conversation subject and it is used as an additional performance criterion as hesitations can become an advantage in measuring effective communication.

The Method of Evaluating Conversation Effectiveness by a Proposed Metric Called "Customer Share":

Customer's participation to the conversations is a good measure of evaluating the conversation effectiveness. A new metric called "customer share", which shows if the conversation is more like a monologue or a dialogue, is proposed. This metric is calculated in the post-processing module (9) by dividing the customer speech duration by the total speech duration of the agent and customer. These speech durations are extracted from the speech-to-text module's (3.2) outputs.

The Method of Evaluating Conversation Effectiveness by a Proposed Metric Called:

Long silences in the conversation decrease its effectiveness, increase the call-cost for the call-center, bore the customer, and create suspicions about the agents control on the subject. So these are good indicators of conversation effectiveness and agent performance.

So, an analysis parameter called "maximum silence" is improved. Said parameter is calculated from the speech-to-text module's (3.2) text outputs of agent and customer channels, and their time-alignments. The parts where both of the participants do not speak are labeled as silent segments in the post-processing module (9), and the segment that has the longest duration as shown to the user as the "maximum silence duration".

The Method for Evaluating Emotion Pattern of the Conversation by a Proposed Metric Called "Anger Locations":

Anger content of the conversation is calculated by the automatic emotion recognition module (3.3). This module uses Support Vector Machines (SVMs) to train classification the models, and then classifies the agent/customer speech segments into angry/non-angry emotion states.

Finding, and showing the anger durations, or levels of the conversation gives us useful clues about the agent performance or customer satisfaction, but they are not sufficient for complete analysis alone. For example, a customer who is only angry at the beginning of the conversation or who is only angry at the end of the conversation may have equal anger durations, but these cases differ in the case of agent performance analysis. The first case is an indicator of good performance as the agent soothes the customer during the conversation, but the second case is vice-versa. So, we propose a new metric called "anger location" to handle this kind of situations.

In calculating the anger durations, entire call is divided into three portions (beginning, middle, and end) and these portions are labeled if they contain anger that is found by the emotion recognition module (9). The results of this metric are shown with three successive Boolean variables, where "1" shows found anger in the portion. For example, if customer anger location result comes out to be "1-0-0", it shows that the customer is angry at the beginning of the conversation, but he/she calms down in the later parts.

The Method for Detecting Possible Fraud Situations by the Fraud Detection Module (8):

A fraud detection module (9), in which a GMM-based pre-trained voice verification system is integrated into the speech analytics system in the analysis consumer servers (1), is implemented. For instance, the first call over 1 minute as original talker, and evaluate the match score for every other call for the same customer. The lower scored calls are then listed as possible fraud calls.

Some previous systems, which is numbered [US2011010173], also implement a fraud-detection mechanism, but they only rely on delays and fails when the customer is answering which is extracted from the speech-to-text output. In this system, a fraud detection module (8) is implemented; Said fraud detection module (8) uses customer's voice characteristics when deciding the fraud situation. This module is also more reliable as no voice characteristics are considered in the previous system, and using only speech-to-text output may lead to false decisions.

The Customer's Gender Detection Component:

An automatic gender identification module (8) that works on the analysis consumer servers (3) is employed. Said module (8) identifies the gender of the customer by using Hidden Markov Models (HMMs). Although customer's gender is known at the time of the conversation, its automatic detection can be useful in later statistical analysis in the call-c enter.

The Statistical Comparison Component for Analyzing Events in the Call Center:

A statistics comparison component is employed in the post-processing module (9) for analyzing two similar events. For example; it is assumed that agent A is more successful than agent B in selling a product. Statistics comparison component compares speech-to-text module's (3.2) text outputs of agent A, and compare them with agent B's and then lists the words or phrases which differ in terms of relative frequency most. The results are listed both graphically and in terms of numbers. The process starts with retrieving the calls which are filtered by the chosen queries of the user within the corresponding time slices. Then using the speech-to-text outputs of these queries, unigram, bigram and trigram word statistics are found in the post processing module (9).

Most frequent word groups are then shown for each query together with their differences. Some previous systems [US2006277465] also use co-frequency analysis for given text inputs when creating relation maps, but they use already ready texts like internet page contents. In this case, there are no texts at the beginning of the process and system uses texts constituted from the outputs of our speech-to-text module. System (S) also uses differences of the text frequencies rather than the similarities. Other analysis metric's averages and differences are also calculated by the post-processing module (9), and the most statistically significant parameters are marked by using variance analysis (ANOVA).

A GUI Component to Show the Agent Performance:

The agent's performance results are shown as a blood-test table which is shown in FIG. 6. This GUI component shows the minimum, maximum, and average of each analysis parameter of an agent's calls from a certain time slice. It also shows the call-center averages and reference values, and if a parameter diverges from its reference value, it is labeled with stars corresponding to the divergence level. All of the analysis statistics are calculated at the post-processing module (9).

The invention claimed is:

1. A speech analytics system providing accurate statistics comprising:
   a voice recording system that records a plurality of agent/customer calls and writes them in a database of the voice recording system;
   an analysis provider server that adds a plurality of newly recorded calls by the voice recording system to an analysis queue in a manner supporting one another,
   an analysis consumer server which analyzes the calls in the queue, and outputs a plurality of analysis results;
   wherein the analysis consumer server further comprise:
      a call pre-processing module which is a sub-module of the analysis consumer server and separates a plurality of channels of a call recorded in the voice recording system into the call pre-processing module's agent/customer channels, and automatically segments mono channels into voiced/unvoiced and background voice segments;
      a speech-to-text module which is another sub-module of the analysis consumer server that automatically transcribes and time-aligns agent and customer speech segments and determines the agent's speech speed by determining that the agent's speech matches a predetermined entry of commonly used agent scripts and phrases with high recognition accuracies, then calculating the duration of the agent's speech from the time-aligned output, and dividing the duration by the total number of letters in the output text of the agent's time-aligned speech segment;
      an emotion recognition module which is another sub-module of the analysis consumer server that automatically classifies the agent and customer speech segments as angry/non angry;
      a gender identification module which is a module of the analysis consumer server that automatically classifies a customer's gender;
      a fraud detection module which is a module of the analysis consumer server that decides a fraud probability of the calls using the customer speech segments.

2. The speech analytics system of claim 1, further comprising a post-processing module which is a sub-module of the analysis consumer server that collects the outputs of the previous modules and merges them to get a final analysis results of the call.

3. The speech analytics system of claim 1, further comprising a grid-based structure to utilize agent PC's as the analysis consumer server.

4. A method of accurate statistics by using a speech analytics system, comprising:
   wherein the speech analytics system including
      a voice recording system that records a plurality of agent/customer calls and writes them in a database of the voice recording system;
      an analysis provider server that adds a plurality of newly recorded calls by the voice recording system to an analysis queue in a manner supporting one another,
      an analysis consumer server which analyzes the calls in the queue, and outputs
   a plurality of analysis results;
   wherein the analysis consumer server further includes a call pre-processing module which is a sub-module of the analysis consumer server and separates a plurality of channels of a call recorded in the voice recording system into the call pre-processing module's agent/customer channels, and automatically segments mono channels into voiced/unvoiced and background voice segments;

a speech-to-text module which is another sub-module of the analysis consumer server that automatically transcribes and time-aligns agent and customer speech segments;

an emotion recognition module which is another sub-module of the analysis consumer server that automatically classifies the agent and customer speech segments as angry/non angry;

a gender identification module which is a module of the analysis consumer server that automatically classifies a customer's gender;

a fraud detection module which is a module of the analysis consumer server that decides a fraud probability of the calls using the customer speech segments;

the method further comprising:

separating a plurality of call-center conversations into a plurality of agent and customer channels;

manually transcribing the agent and customer channels;

calculating distinct n-gram statistics for the agent and customer channels using the transcribed texts;

building separate language model files for the agent and customer channels from these statistic employing a text area where commonly used agent scripts and phrases with high recognition accuracies are entered;

searching a speech-to-text output of the agent channel for the phrases and scripts;

calculating a total duration of agent's speech from the time-aligned output of the phrases;

dividing the duration to the total number of letters in the output text.

5. The method of claim 4, comprising:

tagging background and incoherent speech parts while manually transcribing the call-center conversations;

adding a new model called "speech-filler" to an acoustic model phone list;

constructing an Hidden Markov Model (HMM) for the speech-filler model using the tagged speech parts;

building an acoustic model file with the addition of this filler-model.

6. The method of claim 4, further comprising:

using information from an opposite channel in deciding about the validity of the current channel's speech regions;

analyzing the regions where the opposite party is not speaking using a plurality of previous voiced/unvoiced decisions;

calculating an estimate volume level for the current participant's speech from the decisions;

setting a certain ratio of that volume level as a threshold for a voice activity detection system;

using the threshold to eliminate background speech by comparing with the current segments energy level.

7. The method of claim 4, comprising:

employing a text area where a plurality of stop-words for interruption are entered;

finding a plurality of interrupts from a speech-to-text module's output text and time-alignments;

eliminating the interrupts having the stop-words;

dividing the number of interrupts by the total speech duration to get the final result.

8. The method of claim 4, comprising:

concentrating on energy level as well and disregarding low energy regions;

calculating the voice monotonicity of a plurality of speech parts that are not disregarded in the first step.

9. The method of claim 4, further comprising:

finding a plurality of speech parts that the agent hesitates;

normalizing the hesitation count by the agent speech duration on the entire call by using the outputs of the speech-to-text module;

calculating an "agent hesitation count per minute" parameter in a post-processing module.

10. The method of claim 4, further comprising:

finding the speech durations of agent and customer channels by using the time-aligned outputs of the speech-to-text module;

getting the ratio of the durations to find a customer share in the post-processing module.

11. The method of claim 4, comprising:

finding a plurality of time slices where both agent and customer do not speak by using the time-aligned outputs of the speech-to-text module;

finding a silent time slice that has the maximum duration in the post-processing module and returning its duration.

12. The method of claim 4, comprising:

dividing a call into three portions as beginning, middle and end;

labeling these portions if they contain anger by using the outputs of an emotion recognition module;

returning a plurality of anger locations with three successive Boolean variables, where 1 shows found anger in the portion in the post-processing module.

13. The method of claim 4, comprising: selecting a first call which the customer speaks more than one minute as an enrollment record;

separating the customer channel of the call to use and then trimming its silences;

generating the customer's Gaussian mixture model (GMM) based voice-print using the selected and trimmed channel;

evaluating a match score for every other call of the same customer in which he or she speaks more than one minute using a fraud detection module;

listing a plurality of lower scored calls as fraud candidates.

14. The method of claim 4, comprising:

training an Hidden Markov Model (HMM) based a plurality of gender models for a plurality of male and female speakers;

separating the customer channel of the call, and trimming the silent parts;

using the gender identification module to identify the customer's gender.

15. The method of claim 4, comprising:

allowing a user to select two events to compare;

retrieving the calls related to the events;

using the retrieved calls' outputs of the speech-to-text module to find the unigram, bigram and trigram word statistics;

showing a plurality of most frequent word groups for both events, together with the most differentiating word groups between these events;

using the retrieved calls' outputs of the post-processing module to find the analysis metric's averages for both events and the differences between these events, and showing them to the user;

marking the most statistically significant analysis metrics by using a plurality of variance analysis results.

16. The method of claim 4, comprising:

calculating the minimum, maximum, and average of each analysis metrics' outputs that are generated by the post-processing module, for the selected agent and certain time slice;

showing the results as a blood-test table together with the regarding time slice's call-center averages and a plurality of metrics' reference values.

* * * * *